United States Patent [19]
Robbins

[11] Patent Number: 5,123,453
[45] Date of Patent: Jun. 23, 1992

[54] PIPE INSULATION

[75] Inventor: Hal J. Robbins, Douglasville, Ga.

[73] Assignee: CertainTeed Corporation, Valley Forge, Pa.

[21] Appl. No.: 615,384

[22] Filed: Nov. 19, 1990

[51] Int. Cl.$^5$ .............................................. F16L 9/14
[52] U.S. Cl. ................... 138/149; 138/151; 138/156; 138/167
[58] Field of Search ............... 138/149, 151, 128, 156, 138/170, 167, DIG. 1; 220/359; 122/194; 156/215, 250

[56] References Cited

U.S. PATENT DOCUMENTS

| | | | |
|---|---|---|---|
| 2,721,023 | 10/1952 | Phipps | 156/250 |
| 2,763,047 | 9/1956 | Laster | 138/156 |
| 2,949,953 | 8/1960 | DiMaio | 138/149 |
| 3,849,240 | 11/1974 | Mikulak | 138/170 |
| 4,023,589 | 5/1977 | Rejeski | 138/149 |
| 4,213,487 | 7/1980 | Funk et al. | 138/DIG. 1 |
| 4,413,656 | 11/1983 | Pithouse | 138/110 |
| 4,802,509 | 2/1989 | Brandolf | 138/110 |

FOREIGN PATENT DOCUMENTS 309698  3/1969  Sweden ......................... 138/149

*Primary Examiner*—Harvey C. Hornsby
*Assistant Examiner*—James F. Hook
*Attorney, Agent, or Firm*—Paul & Paul

[57] ABSTRACT

A length of pipe insulation is provided, that has a longitudinal slit that enables it to be positioned over a pipe that is to be insulated. A facing material is provided on the exterior of the generally tubular shaped insulation material. The facing material on one side of the slit has a somewhat adhesive-resistant material that lends itself to an adhesive strip not being permanently secured thereto, and a flap of facing material extends across the opening, having an adhesive flap portion generally in overlying relation to the somewhat adhesive-resistant material. The flap is capable of being extended by grasping it and moving it such that the adhesive portion extends further around the tubular shape to be able to engage the facing material, a securement strip holds the flap folded in a restrained fold but is capable of being broken when force is applied. This results in an insulation covering and a method of covering pipe, whereby the use of discardable release paper is avoided, in that the somewhat adhesive-resistant strip of release paper is captured in the installation, after the pipe is wrapped with the insulation.

8 Claims, 2 Drawing Sheets

PIPE INSULATION

BACKGROUND OF THE DISCLOSURE

Pipe insulation, and preferably fiberglass pipe insulation, while being available in faced or unfaced conditions, is usually provided in faced condition, such that it has a generally flexible, paper-like covering on its tubular exterior. The insulation is generally provided with a longitudinal slit so that it is capable of being opened up and snapped closed over a pipe. Generally, a part of the facing material is provided in the form of a flap that is adapted to overlie the slit that enables the insulation to be applied to a pipe, such that after the insulation is applied to a pipe, the flap may be used to seal across the opening, in adhesive engagement with a portion of the facing material on the other side of the opening.

For purposes of packaging, adhesive material that is present on the flap, or on the material's exterior surface, is provided with a release paper that is removed at the situs and time of insulation installation so that a fresh adhesive surface is presented to the surface to which it is to be applied. Once applied, the insulation then remains on the pipe because of the adhesive facing that is applied to maintain the tubular section of insulation closed relative to the pipe.

Typical of such closures are U.S. Pat. Nos. 4,022,248; 4,157,410; 4,243,453; 4,606,957; 4,857,371 and 4,778,700.

Generally, a common problem with such prior art techniques, is that over the adhesive strip or portion that is to secure the flap to the facing material, there is provided a release paper which must first be removed and discarded. This results in unnecessary trash accumulation on the job site. In order to remove such trash from the job site, a certain amount of time is necessary at the completion of the job, or at the completion of the day's work, which can be labor-intensive and add to the cost of a job.

SUMMARY OF THE INVENTION

The present invention is directed to providing pipe insulation that is capable of being installed without resulting in discardable pieces of release paper or the like.

Accordingly, it is a primary object of this invention to provide a length of pipe insulation in which a closure may be effected without resulting in generating a discardable adhesive-resistant cover sheet.

It is a further object of this invention to accomplish the above object, wherein a flap of facing material is capable of spanning a closure opening in a tubular shaped section of pipe insulating material, for securement to a portion of facing material across the opening.

It is a further object of this invention to accomplish the above objects, wherein the lengths of pipe insulation may be packed with an adhesive portion disposed so that it will ordinarily be in contact with a non-permanent-securement (temporary securement) surface, but which is capable of being moved so that after installation it is in contact with a generally permanent attachment surface.

Another object of this invention is to accomplish the above object, in which facing material of the flap is initially retained in a first position, but which is capable of being spread to a second position to effect adhesion of the flap to facing material across the opening.

It is a further object of one embodiment of this invention to effect the temporary retention of facing material by means of folds in the facing material that are secured by a frangible tape or other securement means.

It is another object of this invention to accomplish the above objects, in providing an installed length of pipe, with a release or non-permanent-securement surface portion of the cover sheet captured in the covering in the installed condition.

It is another object of this invention to provide a method of covering a pipe, utilizing insulation as set forth in the objects above.

Other objects and advantages of the invention will be readily apparent to those skilled in the art from a reading of the following brief descriptions of the drawing figures, the detailed description of the preferred embodiment and the appended claims.

BRIEF DESCRIPTIONS OF THE DRAWING FIGURES

BRIEF DESCRIPTION OF THE PREFERRED EMBODIMENT

Figure 1:
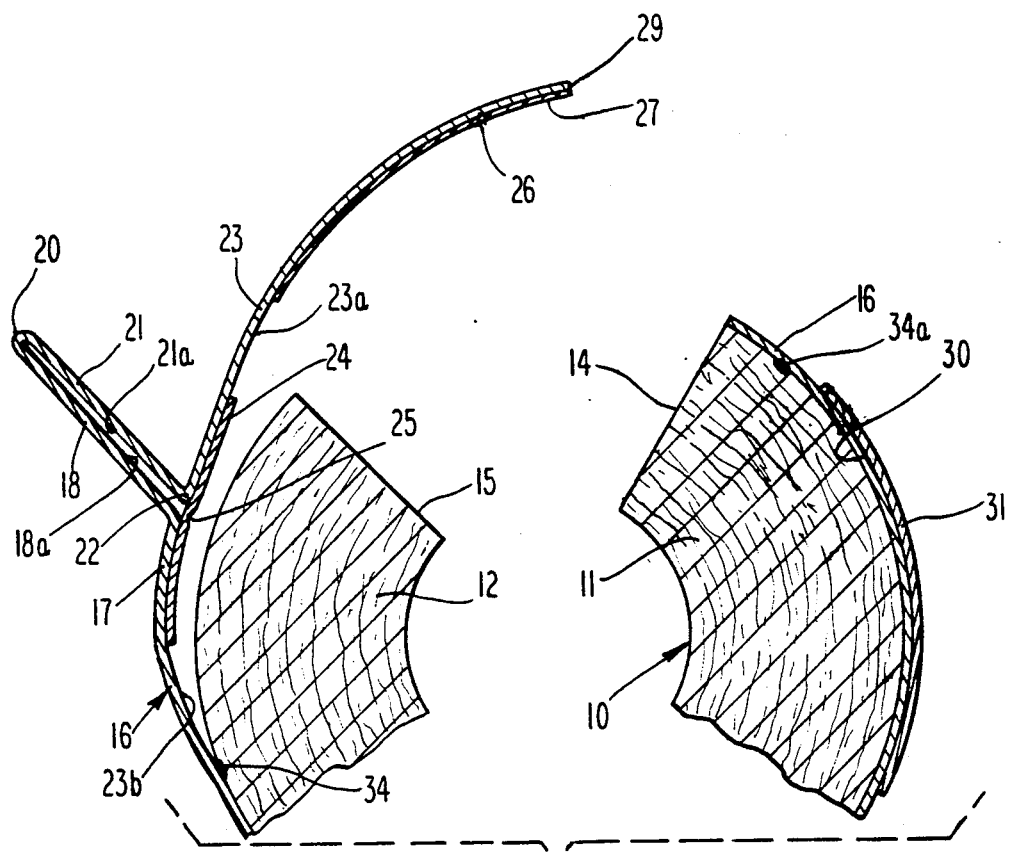
FIG. 1 is an enlarged fragmentary cross-sectional view of a length of generally tubular pipe insulation, shown somewhat spread, so as to be applied over a length of pipe.
Figure 3:
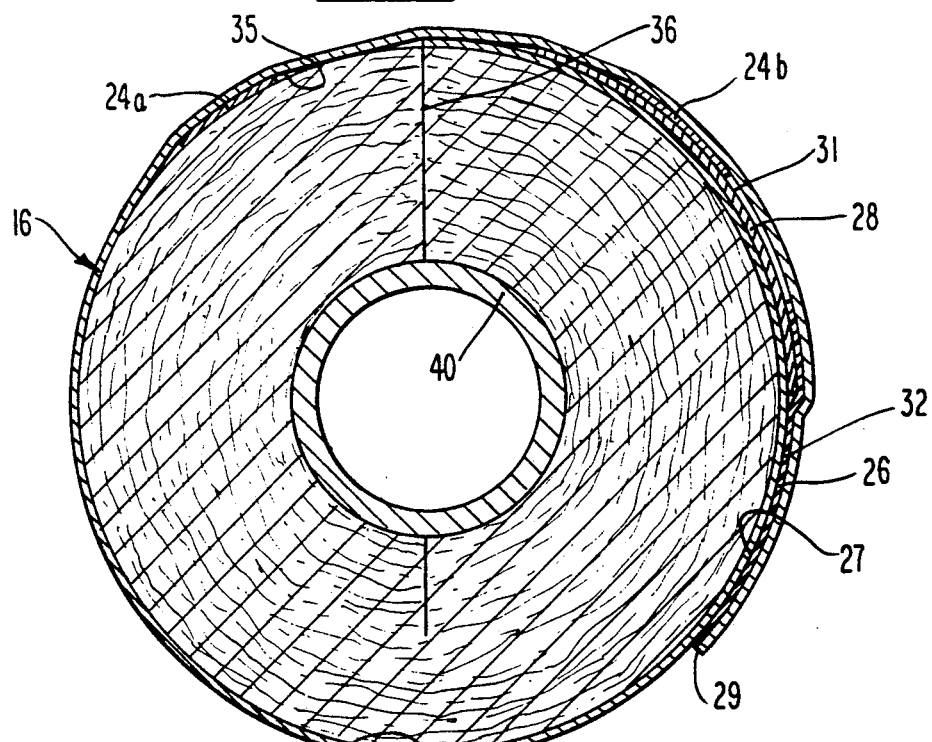
FIG. 3 is an enlarged fragmentary cross-sectional view, taken through the insulation of FIG. 1, after it has been applied to a pipe, and after the flap has been closed and adhesively secured to facing material across an insulation opening.
Figure 2:
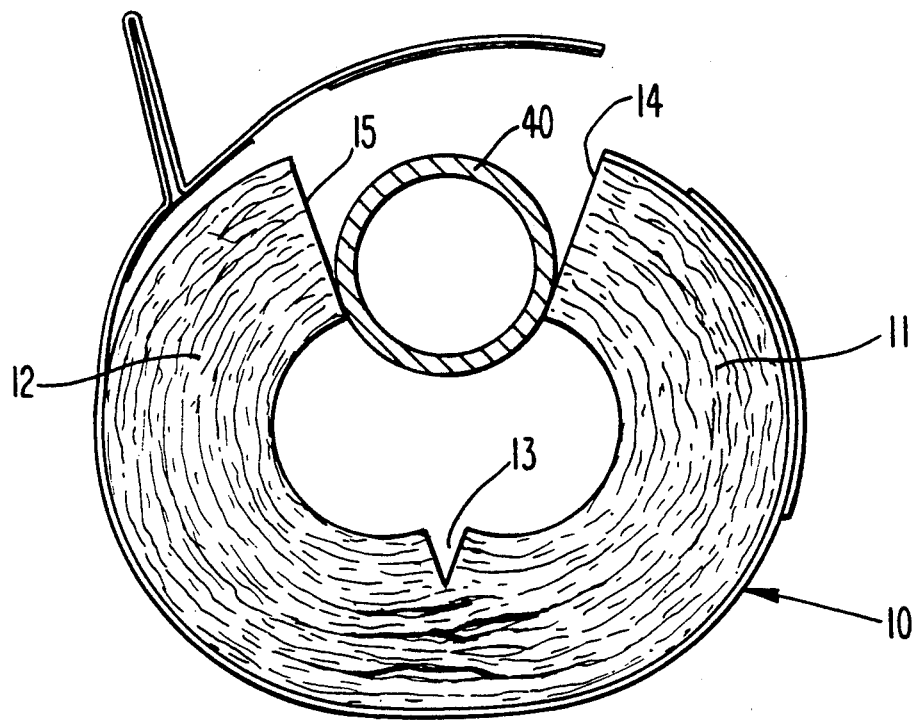
FIG. 2 is a cross-sectional view taken through the insulation of FIG. 1, as the insulation is being applied to a length of pipe.
Figure 4:
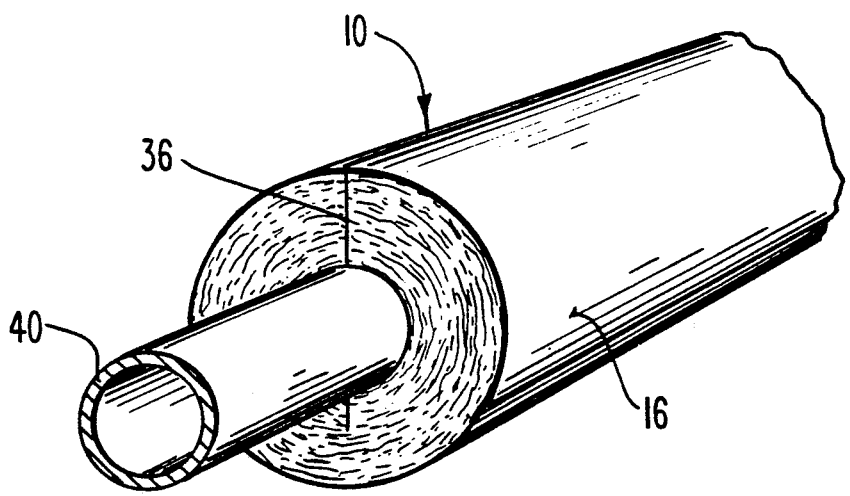
FIG. 4 is a fragmentary perspective view of a length of pipe with insulation material of this invention having been applied thereto.

Referring now to the drawings in detail, reference is first made to FIG. 1, wherein a length of pipe insulation is generally designated by the numeral 10, as including a generally tubular shaped section of preferably fiberglass insulation of any of selected lengths, with the opposite ends 11, 12 of the tubular section being shown in spread-open relation about partial slit 13 (FIG. 2), to yield spaced apart ends 14, 15 across a slit opening 36, as shown in FIG. 3.

A covering of facing material 16 is provided, which may be of any suitable material, such as paper or the like, that will preferably accept an adhesive. Generally, the inside surface of the material 16 is adhered to the exterior surface of the tubular fiberglass, by means of a pair of beads of adhesive 34, 34a on opposite sides of the ends 14, 15 and at 34b (FIG. 3), about 180 degrees away from slit opening 36. Alternatively, the inside surface of material 16 can be adhered to the exterior surface of the tubular fiberglass in surface-to-surface engagement, by means of an adhesive that extends around the exterior circumference of the fiberglass, (not shown). In any event, a flap 16 of facing material is initially unconnected to that end of the insulation material 12 at the upper left of FIG. 1, and is unconnected to that end of the insulation material 11 at the upper right of FIG. 1. The flap 16 contains a leg 17, a fold portion 18 of the leg 17, a fold line 20, a fold portion 21, another fold line 22, and a leg portion 23.

A strip of adhesive-surfaced tape 24 is provided, with the adhesive on its upper layer, adhesively securing the tape to zone or leg 17, and to flap leg 23, as shown, across the fold line 22. The tape 24 preferably has a perforation line 25, for ease of tearing along longitudinal line 25 when the flap is grasped manually at flap portion 23 and outward force applied thereto. It will be noted that the tear line 25 may comprise a series of perforations or a longitudinal line of weakened tape material, as may be desired.

An adhesive section of flap 16 is provided at 26, beginning at its outer end 29, and continuing for a distance counterclockwise thereof as viewed in FIG. 1. Preferably, this adhesive is in the form of a double adhesive-sided tape, one side of which will be secured to the underneath of flap 16, as indicated, with the other side being tacky for adhesive securement to an attachment surface of the facing material on the other side of the slit opening 36 after application to a pipe. In this regard, the adhesive surface 27 will be applied to a facing material. It will be noted that in the embodiment shown in FIG. 1, aside from the adhesive surface 27 of the tape 26, the inner surfaces of the facing material 16 above the location 34 where the adhesive stops being applied to secure the facing material 16 to the insulation 12, all other interior surfaces of the facing material and tape 24, such as those 23, 23a, 23b and 24, are not adhesively secured together. Additionally, when a tape 24 is used to close the fold portions 18, 21, the fold portions 21 and 18 are not adhesively secured together, except to the extent that the tape 24 secures portion 23 to portion 17. Alternatively, instead of the tape 24, releaseable or temporary adhesive can hold the fold portions 18, 21 in place, for example, if applied on the facing surfaces 18a, 21a, to temporarily hold these surfaces 18a, 21a in surface-to-surface engagement until the flap 16 is extended as shown in FIG. 3.

When, in the packaged or shipped condition, the insulation material 10 is closed such that the insulation ends 14 and 15 are in general surface-to-surface engagement (not shown), the adhesive surface 27 of tape 26 will overlie, but not permanently adhere to, the non-permanent-securement temporary securement surface or release paper surface 31 of a release zone preferably in the form of a strip of release paper 28 that is preferably longitudinally present at a location along the facing material 16, and adhesively secured thereto at 30. Thus the surface 31 provides a slight or temporary base for adhesive engagement of adhesive surface 27 thereagainst, prior to opening of the fold 18, 20, 21. The surface 31 may be a strip that is separate from or integral with the facing material 16.

With reference again to FIG. 2, it will be seen that the insulation is spread, such that its ends 14, 15 can be applied over a length of cylindrical pipe 40, to then be allowed to come together to form a parting line or opening 36, after applied over the pipe 40, as is shown in FIG. 3. Once the insulation is applied to the pipe, the outer end of the flap 23 will be grasped by the installer and pulled rightward as viewed in FIGS. 1, 3, breaking the perforated tape 23 or adhesive between fold portions 18, 21 or other retention means longitudinally, along line 25. If the retention means is a tape, this will split it into two parallel longitudinal strips 24a and 24b, as shown in FIG. 3. This will permit the fold portions 18 and 21 to be spread, allowing them to open as at 35. The adhesive surface 27 will then, at least in part, be able to reach circumferentially clockwise or rightward, as viewed in FIG. 3, such that at least a portion of it overlies the facing material 16, as at 32, and is generally permanently adhesively secured thereto, such that the right-most end 29 of the flap is shown rightward of the release or non-permanent-securement portion 28.

It will thus be seen that the release-paper or non-permanent-securement portion 28, in the installed condition of the insulation, is captured or retained therein, and that no discardable paper need be torn from the insulation to assemble the same over a pipe. Rather, the release paper or liner 28 becomes an integral part of the assembly.

It will be apparent from the foregoing that various modifications may be made in the details of construction, as well as in the use and operation of the device of the present invention, all within the spirit and scope of the invention as defined in the appended claims.

What is claimed is:

1. A length of pipe insulation comprising a generally tubular shaped section of insulating material having a generally longitudinal opening that is openable and closeable to accommodate the insulation being disposed over a pipe, a facing material on the exterior of the tubular section, longitudinally disposed closure means on said facing material proximate said opening for closing the opening after disposition of the insulation on a pipe, the improvement comprising said closure means including:
   (a) an adhesive portion on the facing material;
   (b) a temporary securement portion permanently carried on the facing material for substantially temporary adherence of the adhesive portion thereto;
   (c) an attachment surface portion on said facing material for substantially permanent securement of the adhesive portion thereto;
and comprising means for substantially permanently closing the opening after installation of insulation on a pipe, without generating a discardable adhesive-resistant cover sheet.

2. The insulation of claim 1, with said adhesive portion having a first position on said facing material to overlie said temporary securement portion in the pre-installed condition of the insulation and a second position to overlie said attachment surface portion in the installed condition of the insulation on a pipe with said opening closed.

3. The insulation of claim 2, wherein said adhesive portion is carried by a flap of facing material for spanning said opening.

4. The insulation of claim 3, including generally longitudinal fold means in said flap of facing material for accommodating the retention of facing material of said flap in the first position of said adhesive portion while said fold means is folded and for permitting spreading of facing material of said flap in the second position of said adhesive portion while said fold means is unfolded.

5. The insulation of claim 4, including frangible securement means for releaseably retaining said fold means in a folded position and for frangibly allowing the unfolding of said fold means for spreading of said facing material.

6. The insulation of claim 5, wherein said frangible securement means comprises a tape strip extending across a fold line and longitudinally thereof.

7. The insulation of claim 6, wherein said tape strip has a generally longitudinal tear line, which comprises means for tearing and permitting opening of said fold means in response to opening force applied to said flap.

8. An installed length of pipe covering comprising a generally tubular shaped section of insulation material having a generally longitudinal opening therein, a facing material on the exterior of the insulation material, longitudinally disposed closure means on the facing material in closing relation to the opening, said closure means including:

(a) an adhesive portion on the facing material;
(b) a temporary securement portion permanently carried on the facing material for disposition against the adhesive portion in a non-installed condition of the pipe covering; and
(c) an attachment surface on said facing material;

with said adhesive portion in attached relation to said attachment surface with said closure means in closed relation to said opening, and with said temporary securement portion in captured relation to said facing material in the closed condition of said opening.

* * * * *

UNITED STATES PATENT AND TRADEMARK OFFICE
CERTIFICATE OF CORRECTION

PATENT NO. : 5,123,453
DATED : June 23, 1992
INVENTOR(S) : Hal J. Robbins

It is certified that error appears in the above-identified patent and that said Letters Patent is hereby corrected as shown below:

Col. 2, line 5, delete "non-permanent-"; and

Col. 3, line 40, "temporary securement" should read
-- (temporary securement) --.

Signed and Sealed this

Twenty-fourth Day of August, 1993

Attest:

BRUCE LEHMAN

Attesting Officer    Commissioner of Patents and Trademarks